Aug. 18, 1959     C. J. BINKS     2,899,981

FLOW CONTROL DEVICE

Filed Oct. 1, 1957

INVENTOR
Chester J. Binks
BY
H. F. Johnston
ATTORNEY

United States Patent Office 2,899,981
Patented Aug. 18, 1959

2,899,981

FLOW CONTROL DEVICE

Chester J. Binks, La Grange, Ill., assignor to Scovill Manufacturing Company, Waterbury, Conn., a corporation of Connecticut Application October 1, 1957, Serial No. 687,409

3 Claims. (Cl. 138—46)

This invention is an improvement in variable flow restrictors whose purpose is to maintain a substantially constant rate of flow or delivery of fluid over the wide range of pressures which may be encountered in water supply systems throughout the country.

Various flow resistors have been made of rubber or similar material which are satisfactory in assuring a uniform rate of flow within prescribed pressure limits, only when the hardness of the rubber and dimensions are very accurately controlled.

It is the principal object of the present invention to provide a novel flow control member which is satisfactory for most purposes and is relatively cheap, being made from a sheet metal blank and having a novel means for controlling the flow of fluid under varying pressure conditions.

Another object of my invention is to provide a metal flow control device that will, at a prescribed pressure, close off to a positive unalterable minimum passage way regardless of pressures beyond said prescribed limit.

Other objects and advantages of my invention will appear from the following description along with the accompanying drawing in which.

Figure 2:
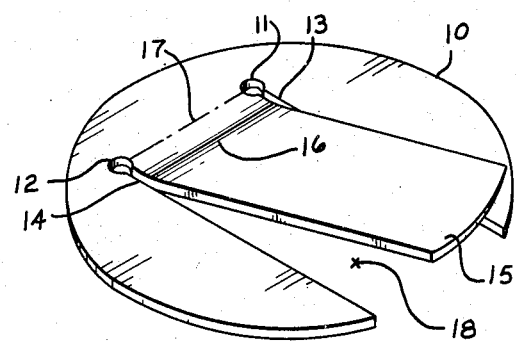
Fig. 2 is a perspective view of my flow restrictor, per se.
Figure 3:
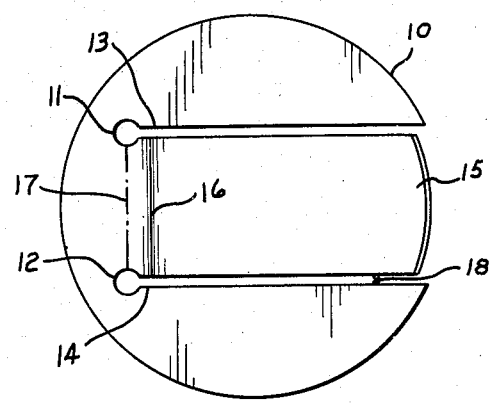
Fig. 3 is a plan view of the same.

The flow control device illustrated in Fig. 2 and 3 of the drawing consists of a thin sheet metal disc 10 formed of a relatively stiff material such as stainless steel or Phosphor bronze. The disc in its initial flat state is provided with a pair of spaced holes 11 and 12 positioned adjacent one edge of the disc and a pair of spaced parallel slots 13 and 14 that intercept the holes 11 and 12 as well as the opposite edge of the disc 10. The disc material between the slots 13 and 14 is bent out from the discs 10 at an arcuate angle and forms a resilient tongue being substantially one-third the width of the disc and its length extending more than half-way across said disc. The hinging action of the tongue relative to the disc will for the most part take place in an area between the holes 11 and 12 as indicated by the dot-and-dash line 17. After the tongue 15 is bent out of the plane of the disc to its normal set position, it provides a relatively large opening 18 in the plane of the disc. It will be noted by reason of slots 13 and 14, the tongue 15 has a width less than the width of this opening and said tongue is entirely free of the disc material during its flexing action back into or toward the plane of the disc, and thus precludes any binding action of the side edges of the tongue against the side edges of the opening 18.

Figure 1:
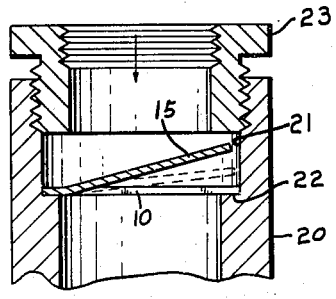
Fig. 1 is a longitudinal sectional view through a pipe conduit having the flow restrictor embodying my invention assembled therein.

In Fig. 1 of the drawing, I have shown a pipe or conduit 20 which may form some part of unit to which my flow control device is to be assembled. In the conduit 20 is a chamber 21 of a size suitable to receive the disc 10 and providing a shoulder 22 against which the disc is adapted to seat with the tongue 15 projecting into the inlet or upstream side of the pipe 20. The disc 10 may be confined within the chamber 21 by a gland nut 23 threaded into one end of said chamber and to which the feed line to the unit may be attached.

In the operation of my device, as fluid passes through the pipe 20 and up to a pressure of about 10 pounds per square inch, there will be no flexing of the tongue 15, thus allowing the maximum flow of fluid to pass through the opening 18. As the fluid pressure increases beyond the above limit, the tongue 15 will be forced downwardly and progressively restrict the opening through the disc and decreasing the size of said opening and proportionately cut off the flow of fluid therethrough. When the fluid pressure increases to such an extent that the tongue 15 is forced back into the plane of the disc 10, the shoulder 22 acts as a stop to limit movement of the tongue and the holes 11 and 12 and the slots 13 and 14 are the only openings through which fluid can pass. This disc is preferably constructed so that the above condition results at about 120° pressure per square inch.

Changes may be made in the above described structure without departing from the spirit of invention the scope of which should be determined by reference to the following claims.

I claim:

1. A flow control device comprising a conduit having a chamber therein with an outer annular shoulder facing the upstream side thereof, a metal disc extending across said chamber and seated against said shoulder, said disc having a resilient tongue which extends lengthwise substantially more than half-way across the disc and integrally joined to the disc at one end, said tongue normally projecting at an acute angle from the plane of the disc toward the upstream side of the chamber, the disc having an opening under said tongue which is progressively restricted as the tongue flexes toward the plane of the disc under the influence of increasing fluid pressure on the upstream side of the disc, the free end of said tongue extending substantially to the region of the periphery of the disc so that it will engage said shoulder to limit flexing of the tongue beyond the plane of the disc.

2. A flow control device a defined in claim 1 wherein the opening in the disc is somewhat wider than the tongue so as to allow restricted flow even when the tongue is in the plane of the disc.

3. A flow control device as defined in claim 1 wherein the disc has a pair of holes intercepted by the sides of the tongue at the end where it is attached to the disc.

References Cited in the file of this patent

UNITED STATES PATENTS

| | | |
|---|---|---|
| 2,593,315 | Kraft | Apr. 15, 1952 |
| 2,603,062 | Weiler et al. | July 15, 1952 |
| 2,782,934 | Maysilles | Feb. 26, 1957 |

UNITED STATES PATENT OFFICE
CERTIFICATE OF CORRECTION

Patent No. 2,899,981          August 18, 1959

Chester J. Binks

It is hereby certified that error appears in the printed specification of the above numbered patent requiring correction and that the said Letters Patent should read as corrected below.

Column 1, line 20, for "resistors" read -- restrictors --; line 53, same column, for "arcuate" read -- acute --.

Signed and sealed this 5th day of January 1960.

(SEAL)

Attest:
KARL H. AXLINE
Attesting Officer

ROBERT C. WATSON
Commissioner of Patents